United States Patent
Ferguson et al.

(10) Patent No.: US 6,564,868 B1
(45) Date of Patent: May 20, 2003

(54) CUTTING TOOL AND METHOD FOR CUTTING TUBULAR MEMBER

(75) Inventors: Andrew M. Ferguson, Oklahoma City, OK (US); Bryan F. McKinley, Oklahoma City, OK (US); Mark S. Britton, Carter, OK (US); Charles C. Overstreet, Katy, TX (US)

(73) Assignee: Cudd Pressure Control, Inc., Houtna, LA (US)

( * ) Notice: Subject to any disclaimer, the term of this patent is extended or adjusted under 35 U.S.C. 154(b) by 0 days.

(21) Appl. No.: 09/690,881

(22) Filed: Oct. 16, 2000

(51) Int. Cl.$^7$ .............................................. E21B 29/00
(52) U.S. Cl. ................ 166/298; 166/55; 166/55.1; 166/222
(58) Field of Search ................ 166/298, 55, 55.1, 166/222, 223

(56) References Cited

U.S. PATENT DOCUMENTS

| | | | |
|---|---|---|---|
| 3,066,735 A | * 12/1962 | Zingg | 137/329.01 |
| 3,130,786 A | * 4/1964 | Brown et al. | 166/223 |
| 3,193,012 A | * 7/1965 | Huitt et al. | 166/223 |
| 3,266,571 A | * 8/1966 | St. John et al. | 166/223 |
| 4,346,761 A | * 8/1982 | Skinner et al. | 166/206 |
| 4,478,368 A | 10/1984 | Yie | |
| 4,534,427 A | * 8/1985 | Wang et al. | 175/104 |
| 4,671,359 A | 6/1987 | Renfro | |
| 4,694,908 A | 9/1987 | Morris et al. | |
| 4,761,039 A | 8/1988 | Hilaris | |
| 4,763,737 A | 8/1988 | Hellnick | |
| 4,795,217 A | 1/1989 | Hilaris | |
| 5,056,269 A | 10/1991 | Westman | |
| 5,335,724 A | * 8/1994 | Venditto et al. | 166/250.1 |
| 5,337,819 A | 8/1994 | Tailby | |
| 5,381,631 A | * 1/1995 | Raghavan et al. | 166/298 |
| 5,402,855 A | 4/1995 | Gondouin | |
| 5,445,220 A | * 8/1995 | Gurevich et al. | 166/223 |
| 5,575,331 A | 11/1996 | Terrell | |
| 5,924,489 A | * 7/1999 | Hatcher | 166/298 |
| 6,155,343 A | * 12/2000 | Nazzal et al. | 166/222 |
| 6,325,305 B1 | * 12/2001 | Kuhlman et al. | 166/222 |
| 6,336,502 B1 | * 1/2002 | Surjaatmadja et al. | 166/104 |

FOREIGN PATENT DOCUMENTS

| | | |
|---|---|---|
| GB | 2288350 | 10/1995 |
| WO | WO 98/07955 | 2/1998 |

OTHER PUBLICATIONS

Patent Abstract of Japan, Patent No. 04034176, European Patent Office (1992).
Patent Abstract of Japan, Patent No. 04041869, European Patent Office (1992).

* cited by examiner

Primary Examiner—Hoang Dang
(74) Attorney, Agent, or Firm—Mary M. Lee

(57) ABSTRACT

A fluid cutting tool and method for perforating or severing tubular members from inside. The tool is especially suited for use with a rotational drive system, such as a downhole motor, to separate downhole structures, such as stuck production tubing. The cutting tool preferably takes the form of an elongate metal body with an open first end connectable to the end of a downhole motor. The downhole end of the tool may be conical. A fluid conduit within the body of the tool communicates with the fluid channel in the downhole motor. Ports in the sides of the tool body direct jets of cutting fluid out the side of the tool. The tool attached to the motor is fed downhole until the tool is at the desired location in the well. Then the motor is operated to rotate the tool while cutting fluid is pumped through it. This causes the jets of fluid to be directed at the inner surface of the production tubing (or other tubular structure). This process is continued until the tubing is perforated or severed, as needed.

20 Claims, 3 Drawing Sheets

CUTTING TOOL AND METHOD FOR CUTTING TUBULAR MEMBER

FIELD OF THE INVENTION

The present invention relates generally to cutting tools and, more particularly, to cutting tools that employ fluid as the cutting element.

BACKGROUND OF THE INVENTION

In the oil and gas industry, it is often necessary to cut, perforate or separate tubular members downhole. For example, when a drill pipe becomes stuck, the drill string must be severed above the stuck point so that the upper portion can be removed. It is sometimes desirable to sever casing or tubing downhole to make repairs or withdraw the tubing from a well that is being abandoned. Occasionally, the tubing or casing may need to be perforated downhole to improve recovery from a formation. Various cutting devices have been used for these purposes. Chemical cutters may be used, but have temperature and pressure limitations. Mechanical cutters may be used, but have size and strength limitations.

SUMMARY OF THE INVENTION

The present invention is directed to a cutting tool. The tool comprises a body formed by a wall and having a longitudinal axis and a fluid conduit. At least one port is formed in the body in fluid communication with the fluid conduit, so that the port is positioned to direct fluid from the fluid conduit through the wall of the body at an angle to the longitudinal axis.

The present invention further comprises a cutting tool assembly. The assembly includes a cutting tool comprising a body formed by a wall and having a first end and a second end. The body has a longitudinal axis and comprises a fluid conduit. At least one port is formed in the body in fluid communication with the fluid conduit, so that the port is positioned to direct fluid from the fluid conduit through the wall of the body at an angle to the longitudinal axis of the body. The assembly further includes a rotational drive system with a first end and a second end. The first end is connectable to a drive source, and the second end is connectable to the first end of the cutting tool.

Still further, the present invention includes a method of cutting a tubular member having a lumen defined by a sidewall with an inner surface. The method comprises directing a jet of fluid from within the lumen of the tubular member at the inner surface of the sidewall in a circumferential motion until the sidewall is at least partially cut.

DETAILED DESCRIPTION OF THE PREFERRED EMBODIMENT

The present invention is directed to a fluid cutting tool and method particularly suitable for downhole cutting operations. This fluid cutting tool will operate at a wide range of temperatures and pressures. It can be driven by different types of drive systems commonly available at the well site, including downhole motors supported on coiled tubing. The fluid cutting tool and method of this invention can be used to cut tubular members having a range of internal diameters. The tool itself is simple to manufacture from a solid steel rod. In addition, it has no moving parts and, thus, is durable and requires minimal repair and maintenance. These and other advantages will become apparent from the following description.

Figure 1:
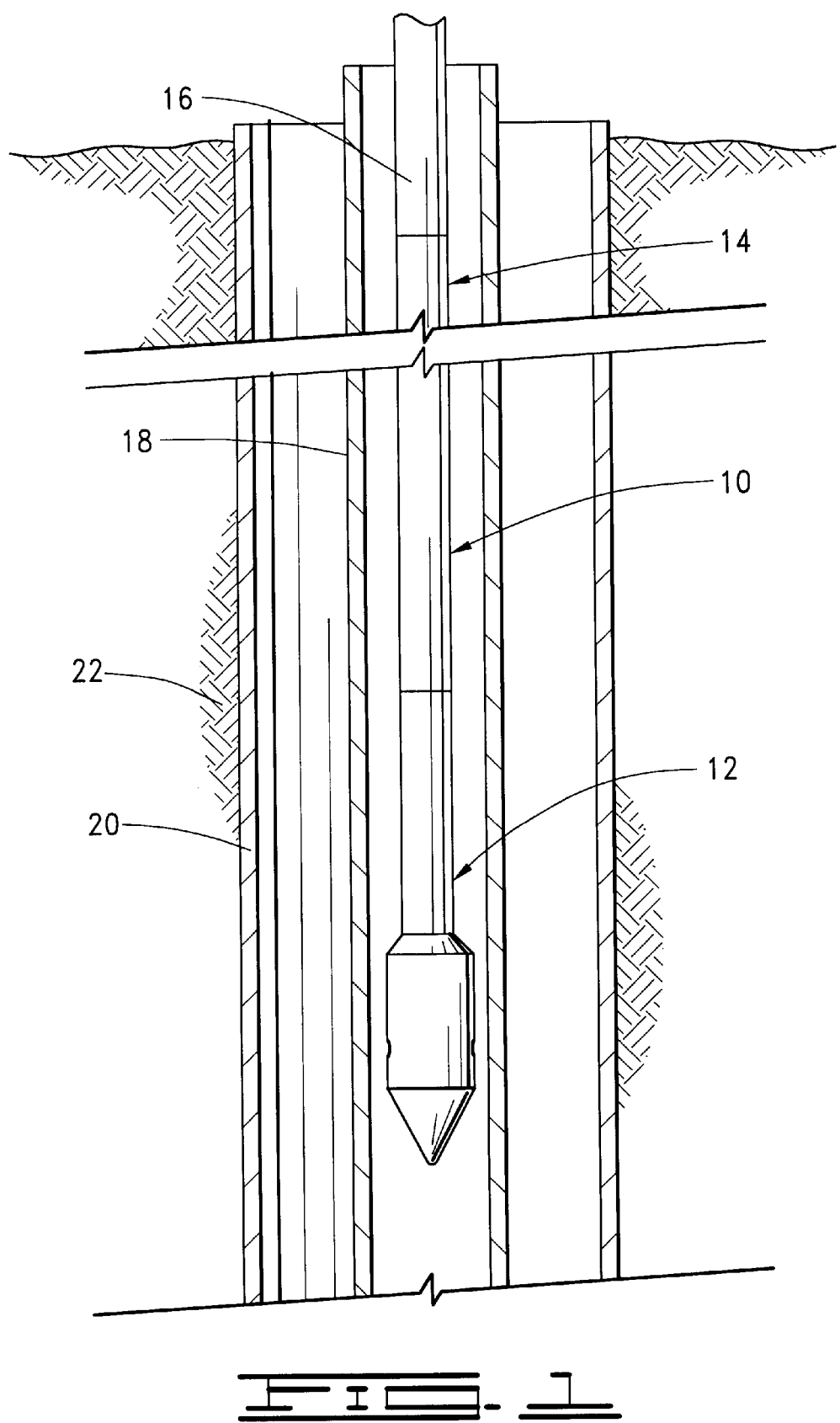
FIG. 1 shows a longitudinal, sectional view of a fluid cutting tool assembly of the present invention positioned inside the production tubing in an oil well at a selected cutting location.

With reference now to the drawings in general and to FIG. 1 in particular, there is shown therein a cutting tool assembly in accordance with present invention and designated generally by the reference numeral 10. The assembly 10 generally comprises a cutting tool 12 and a downhole motor 14 drivingly supported by a drill string 16. In this view, the assembly 10 is shown positioned downhole inside a production tubing 18 within a well casing 20. The casing 20 is shown extending into the earth 22 to an underground formation (not shown).

The rotational drive system, such as the motor 14, may vary and is selected depending on the circumstances and available equipment. Suitable rotational drive systems often readily available at a well site include a downhole motor supported on coiled tubing or other conduit. In the embodiment shown and described herein, a downhole motor 14 will be used as the drive system.

Figure 2:
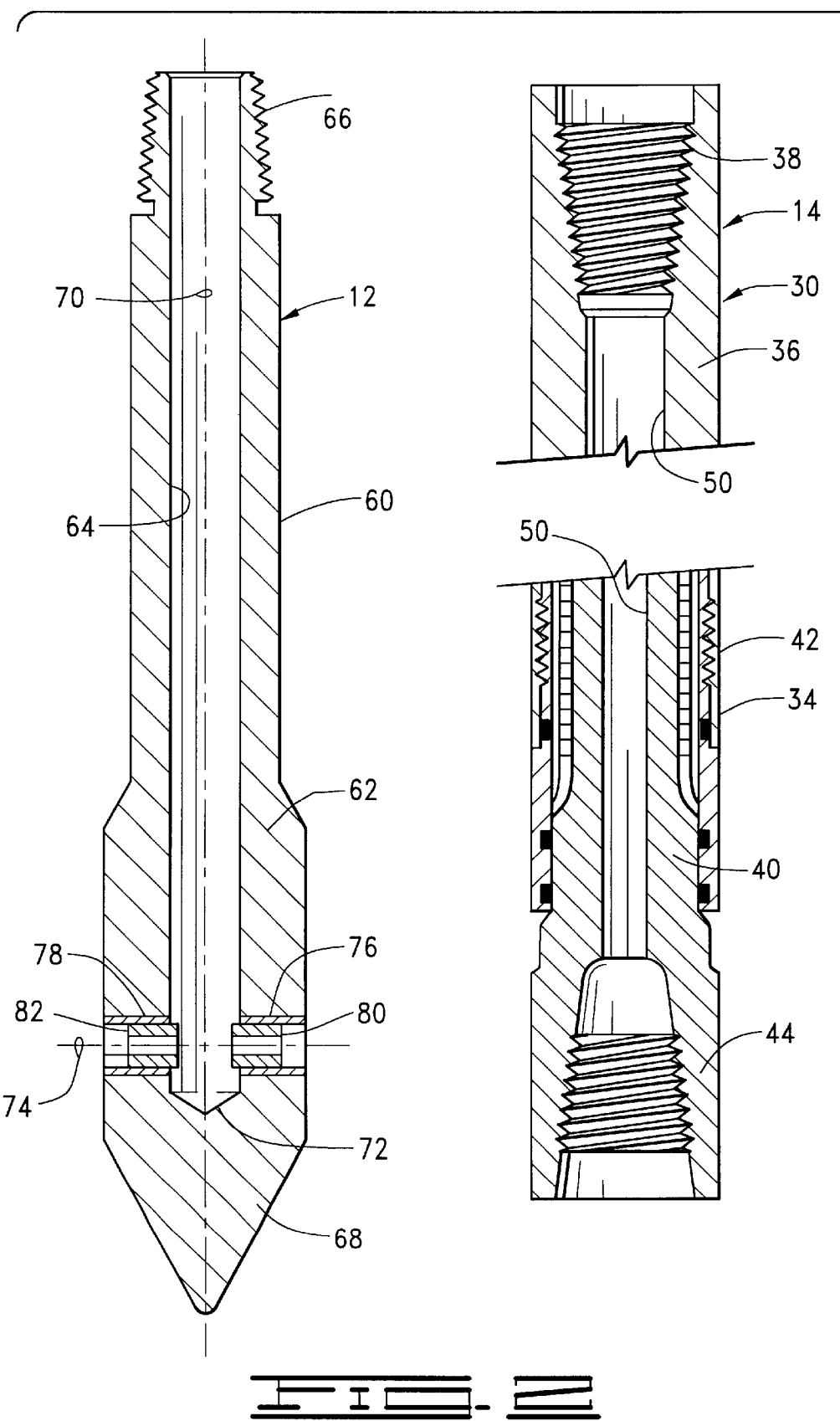
FIG. 2 shows an enlarged, fragmented sectional view of a preferred cutting tool assembly comprising a fluid cutting tool attached to the downhole end of downhole motor.

Turning now to FIG. 2, the preferred assembly will be described in more detail. As indicated, the cutting tool 12 may be driven by a conventional downhole motor 14. Typically, downhole motors comprise a motor section 30, a connecting section (not shown), and a bearing section 34.

The motor section 30 comprises a torque-creating motor. In most instances, the motor will be a Moineau-type positive displacement pump (not shown). This type of pump typically is composed of an inner elongate rotor supported within an outer tubular section, or stator, having a rubber lining. However, other types of positive displacement pumps and motors may be used. The upper end of the motor section, or top sub 36, is connected by the threaded box end 38 to the drill string 16 (FIG. 1) or coiled tubing or threaded pipe or the like.

The connecting section (not shown) usually comprises an inner elongate member, such as a connecting rod, supported in an outer tubular universal housing. The upper end of the connecting rod is drivingly connected to the downhole end of the rotor in the motor section 30, as by a threaded connection.

The bearing section 34 comprises inner elongate member such as a drive shaft 40 supported in an outer tubular member such as the bearing housing 42. The downhole end of the drive shaft 40 preferably extends a distance beyond the downhole end of the bearing housing 42 and may be provided with a threaded box end 44 to connect to the cutting tool 12. The upper end (not shown) of the drive shaft 40 is drivingly connected to the downhole end of the connecting rod, usually by a threaded joint. The upper end (not shown) of the bearing housing 42 is threadedly connected to the downhole end of the universal housing.

In a manner well known in the art, the motor section 30, the connecting section and the bearing section 34 form a continuous fluid pathway 50 for transmitting drilling fluid or "mud" through the motor 14. To provide a fluid seal, the various joints may be provided with O-rings or other seal assemblies. In accordance with the present invention, the downhole motor 14 conveys a cutting fluid under pressure to the cutting tool 12. Thus, the use of motors with sealed bearing sections is recommended.

With continuing reference to FIG. 2, the preferred cutting tool 12 will be described. Preferably, the tool 12 comprises a body 60 formed of a wall 62 to define a fluid conduit 64 therein. In most instances, the body 60 will be elongate and generally cylindrical, but other configurations may be used instead, depending on the application. The tool 12 usually will have a first or upper end 66 and a second or downhole end 68. It is most convenient to provide the upper end 66 with a male threaded or pin end to connect to the female or box end 44 of the downhole motor 14. The tool 12 is characterized as having a longitudinal axis 70.

The downhole or second end 68 of the tool 12 may take various shapes. In most cases a conical end will be preferred. The fluid conduit 64 is open at the upper end 66 to communicate with the fluid pathway 50 in the motor 15. The fluid conduit 64 terminates at a blind end 72 inside the body 60.

The tool 12 may be formed from a solid steel rod by machining the threaded pin end 66, the conical end 68 and fluid conduit 64 inside. The size and dimensions of the tool 12, of course, may vary and, thus, the size of the starting rod stock may likewise vary. A preferred size of tool may be made from 2⅞ inch, 8.7 pound, P-110 pipe.

Referring still to FIG. 2, the tool 12 comprises at least one port as an outlet for the cutting fluid. The number and relative positions of the ports may vary, depending on the circumstances, although they will all communicate with the fluid conduit 64. The ports are positioned to direct cutting fluid from the fluid conduit through the wall 62 of the body 60 at an angle to the longitudinal axis 70 and preferably along the axis 74. In the embodiment shown herein, there are two ports 76 and 78 extending radially from fluid conduit 64 near the blind end 72 at 180 degrees from each other and perpendicular to the longitudinal axis 70.

Because of the abrasive nature of the preferred cutting fluid, it will be advantageous to fix nozzles 80 and 82 in each of the ports 76 and 78. Tungsten carbide nozzles are commercially available in a range of sizes and are well suited for this application. In the embodiment described, 0.106-inch nozzles are preferred.

As indicated, the cutting tool assembly 10 of this invention is designed for use with a cutting fluid. As used herein, "cutting fluid" refers to any liquid or gas composition which can be forced through the drive system and cutting tool and which is capable of having a cutting action on the chosen substrate. The composition of the particular fluid may vary widely depending on the nature of the cutting application. In the preferred practice, the cutting fluid will comprise a liquid and an abrasive agent, such as an abrasive particulate.

When used with a downhole motor, a water-based liquid is suitable. Preferably, the fluid comprises a slurried abrasive solution, and more preferably the fluid is a water-based cross linked sand slurry. In this application, the fluid preferably comprises a mixture or slurry of water and a relatively fine mesh sand as the abrasive agent; 100-mesh sand is ideal. In most instances, it will efficacious to add a gelling or viscosifying agent to the sand and water mixture, to form a cross linked sand slurry. One preferred gelling agent is XANVIS brand gelling agent. This cutting fluid may prepared by placing about 5 barrels of water in a hopper and adding the XANVIS gelling agent in the amount of 25 pounds per 10 barrels of water. Then, the 100-mesh sand is added in the amount of about 1 pound of sand for every gallon of water.

Figure 4:
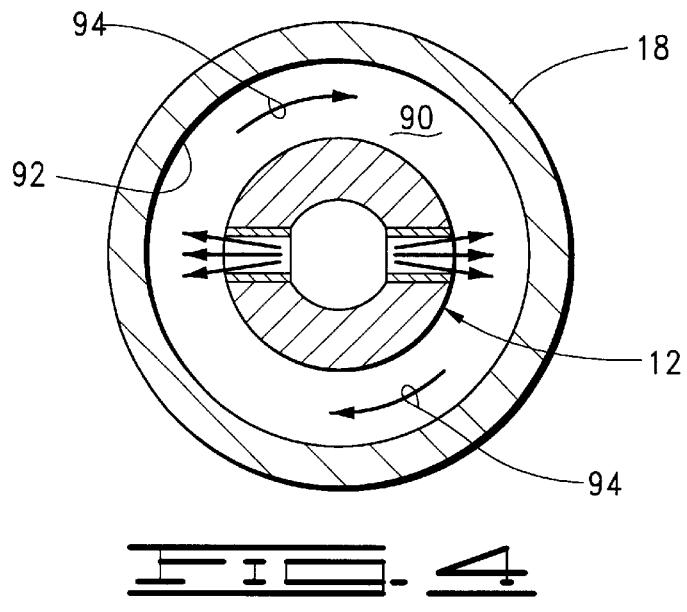
FIG. 4 shows a transverse sectional view taken along line 4—4 of FIG. 3.
Figure 3:
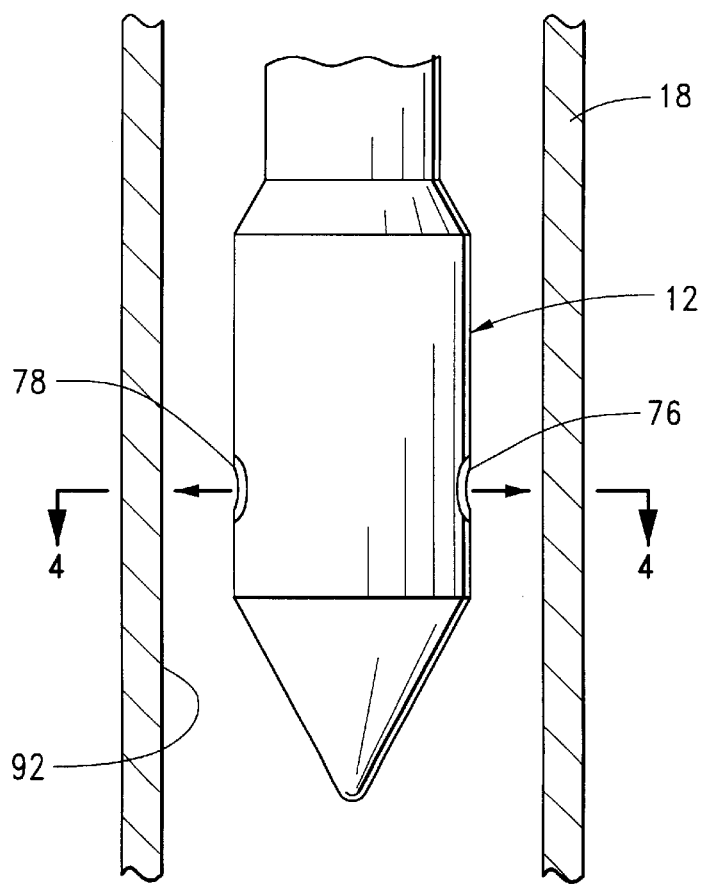
FIG. 3 shows an enlarged side elevational view of the cutting tool inside a tubular member.

With reference now to FIGS. 3 and 4, the use of the cutting tool 12 will be explained in accordance with the method of the present invention. First, a cutting tool of suitable size is selected. The tool 12 then is attached to the desired rotational drive system, such as a downhole motor 14 (see FIG. 2). The cutting tool 12 is positioned at the selected location within the tubular member, such as the production tubing 18 in an oil or gas well (FIG. 1).

Once the tool 12 is positioned, at least one and preferably two jets or streams 86 and 88 of cutting fluid are directed from the tool 12 within the lumen 90 (FIG. 4) of the tubing 18 toward the inner surface 92 of the tubing 18. Although the volume, pressure and speed of the cutting fluid will vary, in the embodiment described the cutting fluid is pumped through the assembly 10 at about 3000 psi. Given the size of the nozzles and the other parameters, this produces a fluid stream of about 1000 feet per second.

The jets of cutting fluid are directed in a circumferential motion, preferably as illustrated by the arrows 94 in FIG. 4. This motion may be oscillating, continuous or pulsed. In the embodiment shown where the assembly utilizes a downhole motor, the tool 12 is continuously rotated at about 200 rpm. The application of the cutting fluid stream to the inner wall 92 of the tubing 18 is continued until the desired perforation or separation of the tubing is achieved. In the embodiment described, the jets of fluid are directed generally perpendicular to the longitudinal axis of the tool and generally normal to the inner surface 92 of the tubing 18. However, the jets may be directed at any angle from the longitudinal axis of the tool.

Now it will be apparent that the cutting tool assembly and method of the present invention offers many advantages. It is easily manufactured of common rod stock. It is sturdy and requires little maintenance. The use of a pressurized cutting fluid instead of mechanical elements such as bits or blades permits a single tool to be used in tubular members of different internal dimensions. The fluid cutting process also allows the tool to be used to cut elements that are non-circular or irregularly shaped. The fluid will operate at a wide range of temperature and pressure conditions, and is not affected significantly by the direction of the tubular member; it will function horizontally as well as vertically, and in curved or straight tubular sections.

It will be appreciated that the fluid cutting tool and method of the present invention, while particularly suitable for downhole cutting applications, is not so limited. This tool and method can be used advantageously in other environments where internal cutting is involved. For example, it can be employed in horizontal directional drilling and other earth excavating operations. It can be used in virtually any application where conduits or pipes need to be perforated, grooved or severed internally.

Changes can be made in the combination and arrangement of the various parts and elements described herein without departing from the spirit and scope of the invention as defined in the following claims.

What is claimed is:

1. A downhole cutting tool assembly for use at the downhole end of an elongate conduit in a well, the assembly comprising:

a fluid-driven downhole motor adapted to receive only a single source of fluid, the motor comprising:
  a tubular housing with an uphole end and a downhole end, wherein the uphole end is removably connectable to the elongate conduit and comprises a single fluid inlet continuous with the elongate conduit;

a rotor with a downhole end, the rotor being supported in the housing and sized to form an annular fluid flow space between the rotor and the housing, the annular fluid flow space continuous with the fluid inlet in the uphole end of the housing whereby the rotor is rotatable in response to the flow of fluid from the elongate conduit through the annular fluid flow space; and an output shaft having an uphole end and a downhole end, the uphole end fixed to the downhole end of the rotor and adapted to rotate with the output shaft at the same speed as the rotor, wherein the downhole end of the output shaft comprises a single outlet by which fluid exits the motor and continuous with the fluid flow space between the housing and the rotor; and a cutting tool comprising a body with an uphole end and having a longitudinal axis, wherein the uphole end is removably connectable to the downhole end of the output shaft of the downhole motor for rotation therewith at the same speed as the rotor, the cutting tool comprising a fluid conduit continuous with the single outlet in the downhole end of the output shaft when the uphole end of the cutting tool is connected thereto, and wherein the body comprises at least one port in fluid communication with the fluid conduit, the at least one port positioned to direct fluid from the fluid conduit out of the body at an angle to the longitudinal axis of the body;

whereby, when the tool assembly is in operation, a single source of fluid passing through the motor and the cutting tool drives the motor and serves as the sole cutting element of the tool.

2. The downhole cutting tool assembly of claim 1 wherein the downhole motor comprises a sealed bearing assembly.

3. The downhole cutting tool assembly of claim 1 wherein the cutting tool is free of parts that move relative to the body when the tool is in use.

4. The downhole cutting tool assembly of claim 1 wherein the body of the cutting tool is elongate and cylindrical.

5. The downhole cutting tool assembly of claim 1 wherein the body has a conical downhole end and wherein the uphole end of the body of the cutting tool is threaded.

6. The downhole cutting tool assembly of claim 1 wherein the at least one port includes two ports extending axially at 180 degrees from each other.

7. The downhole cutting tool assembly of claim 1 wherein the at least one port extends generally perpendicular to the longitudinal axis of the body.

8. The downhole cutting tool assembly of claim 1 further comprising a hardened insert in the at least one port.

9. A downhole cutting tool system comprising:

a single-lumened coil tubing string defining a fluid pathway therethrough;

a gearless, fluid-driven downhole motor having a first end with a single fluid inlet, the first end being removably connectable to the tubing string, a second end with an output shaft having a single fluid outlet, and a fluid pathway extending from the first end single fluid inlet through the single fluid outlet wherein the single fluid inlet is continuous with the single lumen of the coil tubing when connected thereto whereby only a single source of fluid is permitted to pass through the motor;

a cutting tool comprising a body comprising a fluid conduit, wherein at least one port is formed in the body in fluid communication with the fluid conduit, wherein the port is positioned to direct fluid from the fluid conduit at an angle to the longitudinal axis of the body, and wherein the body has an open end continuous with the fluid conduit and that is removably connectable to the output shaft of the motor for direct rotation therewith; and wherein the fluid conduit in the cutting tool and the fluid pathway in the motor are continuous with the fluid pathway in the tubing string when connected thereto so that, during operation of the system, a single source of fluid passes through the motor and the cutting tool and drives the motor and serves as the sole cutting element of the tool.

10. The downhole cutting tool system of claim 9 wherein the body is elongate.

11. The downhole cutting tool system of claim 9 wherein the body is cylindrical.

12. The downhole cutting tool system of claim 9 wherein the first end of the cutting tool is threadedly connectable to the second of the motor.

13. The downhole cutting tool system of claim 9 wherein the at least one port extends generally perpendicular to the longitudinal axis of the body.

14. The downhole cutting tool system of claim 13 wherein the at least one port comprises two ports.

15. The downhole cutting tool system of claim 14 wherein the two ports extend axially at 180 degrees from each other.

16. The downhole cutting tool system of claim 9 wherein the rotor is imperforate.

17. The downhole cutting tool system of claim 16 wherein the downhole motor is Moineau-type positive displacement pump.

18. A method for cutting a downhole tubular member from inside the tubular member, the method comprising:

pumping a slurried abrasive solution through a downhole cutting tool system comprising coil tubing string, a gearless, fluid-driven motor connected thereto to create rotation of an output shaft extending from the motor, and a cutting tool fixed to the output shaft for direct rotation therewith;

wherein the cutting tool comprises a fluid conduit and at least one port in fluid communication with the fluid conduit, the port being positioned to direct the slurried abrasive solution at the inside wall of the downhole tubular member to be cut while the cutting tool is rotating.

19. The method of claim 18 wherein the slurried abrasive solution comprises water, sand and a cross-linking material.

20. The method of claim 18 wherein the slurried abrasive solution is pumped at a pressure sufficient to rotate the cutting tool continuously at about 200 rpms.

\* \* \* \* \*